United States Patent Office 2,865,513
Patented Dec. 23, 1958

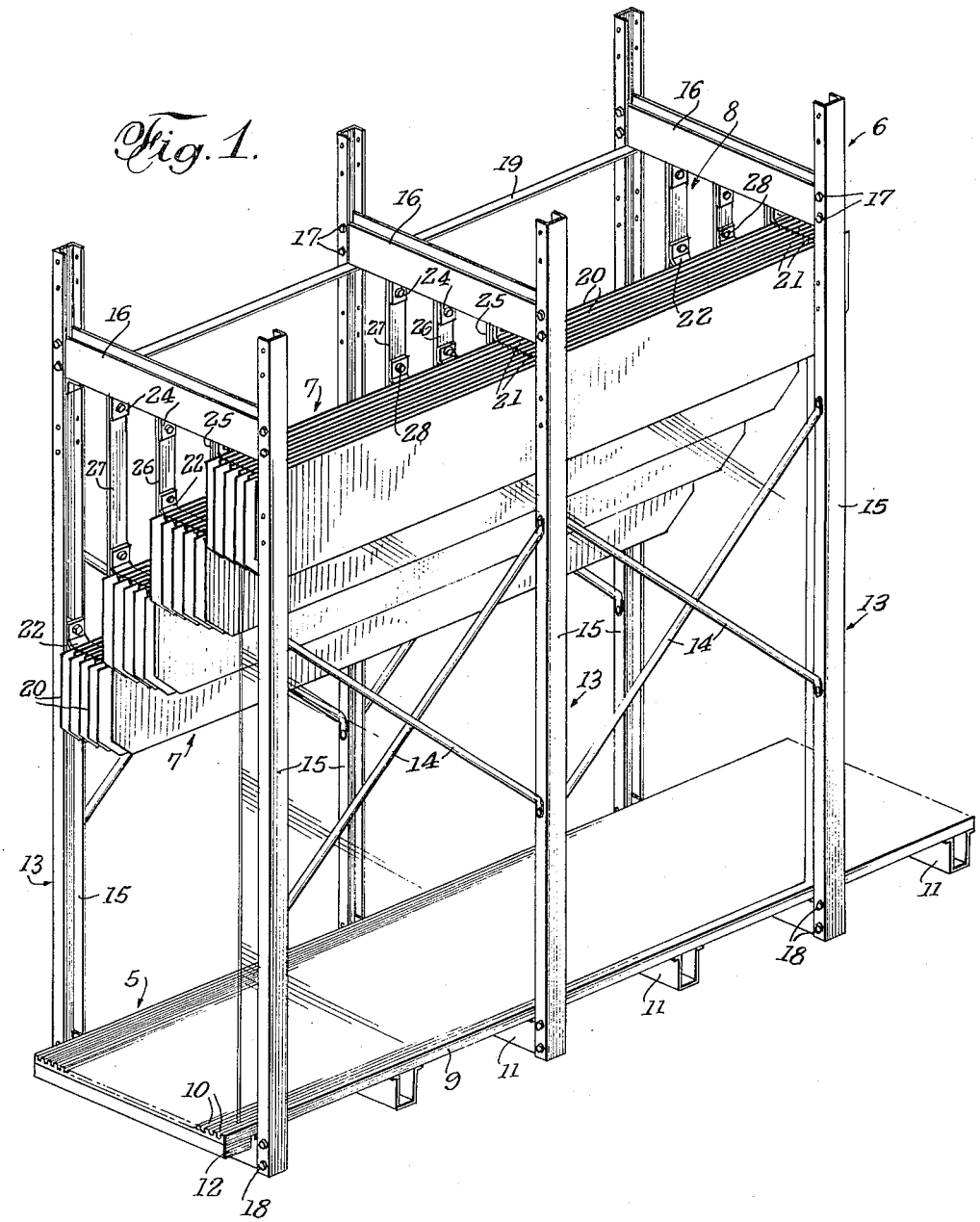

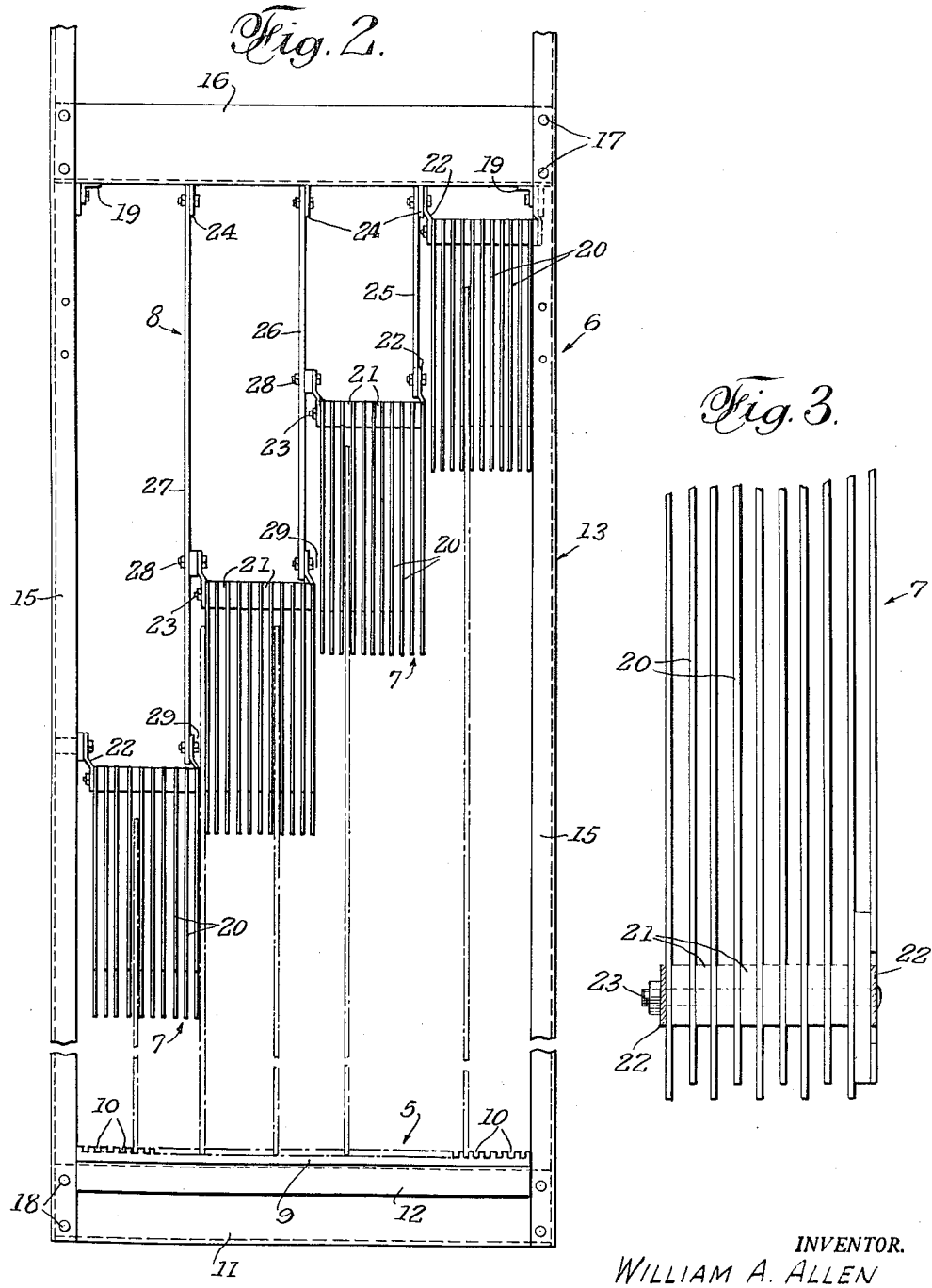

2,865,513

PLATE GLASS STORAGE RACK

William A. Allen, San Bernardino, Calif.

Application January 24, 1955, Serial No. 483,523

7 Claims. (Cl. 211—41)

This invention relates to a rack for storing plate glass, crystal, mirrors, etc., and it is an object of the invention to provide a storage rack that is efficient and compact, and safely stores glass plates even under extreme conditions of shock.

Another object of the invention is to provide a storage rack that is free-standing and, therefore, does not require attachment to the floor or to building walls.

A further object of the invention is to provide a flush-type construction that enables ready slip-type introduction of glass plates into the rack.

A still further object of the invention is to provide a rack having adjustable packs of non-metallic glass separators or dividers, to provide a rack of facile utility. Such a rack may be adjusted according to particular requirements.

A yet further object of the invention is to provide a rack structure of relatively large size, when erected, and devised to be shipped in knock-down compact form, the components of the rack being capable of assembly in two hours or so despite the large size of the completed structure.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawings merely show and the following description merely describes one embodiment of the present invention, which is given by way of illustration or example only.

In the drawings, like reference characters designate similar parts in the several views.

Fig. 1 is a perspective view of a plate glass storage rack according to the present invention.

Fig. 2 is an enlarged and foreshortened front view of said rack.

Fig. 3 is a further enlarged fragmentary plan sectional view taken immediately above one of the packs of separators or dividers.

The rack that is illustrated comprises, generally, a base 5, a vertical frame 6 rigidly secured to said base, a plurality of sets or packs of glass separators 7, and means 8 to support said packs in frame 6 each at a different height above base 5.

The base 5 comprises a preferably non-metallic floor 9 that is advantageously formed of a hard wood and is provided with longitudinal grooves 10. In practice, some forty grooves may be provided in a floor width of some thirty inches, these figures being given as providing a base floor suitable of supporting plate glass ¾ inch and less in thickness. It is preferred to form said floor of several edge-butted wood strips and to connect the same by a set of transverse channels 11 formed of sheet steel and secured to the floor from beneath. Such channels 11 aid, if desired, a hard wood cleat 12 to reinforce the end of the floor at which glass plates are introduced.

The vertical frame 6 is shown as comprising three frame components 13 that are essentially alike and are mutually interconnected by cross braces 14. By extending the ends of some of the channels 11 beyond the side edges of floor 9, the base 5 is provided with means to which said frame components can be connected.

Each component 13 comprises a pair of vertical channels 15 preferably formed of sheet steel, and a similarly formed channel 16 connecting the upper ends of said vertical channels. The cross channels 16 may connect the tops of channels 15 or, as shown, have a selected adjusted position below the upper ends of said channels 15. Bolts 17 may be used to effect such connection and the channels may be provided with plural sets of suitably placed holes that may be selectively used according to the height of adjustment desired. Bolts 18 may be used to affix the lower ends of channels 15 to the mentioned extending ends of base channels 11.

The frame 6 may include a pair of longitudinal angle members 19 that connect the components 13 above where the cross braces 14 are applied.

In this case, four packs or sets of separators 7 are shown and it will be clear that the number of such sets may be varied. Each said set comprises a plurality of non-metallic separator sheets 20 that are advantageously made of a composition material, of which "Masonite" is an example, to be non-abrasive to glass and yet highly resistant to wear by an edge of glass in sliding contact therewith. Preferably wooden spacers 21 separate said sheets 20 at their upper edges, leaving the sheets to depend in spaced relation, substantially as shown. Thus, the sheets of each set of separators 7 are substantially rigid and yet are capable of yielding to lateral forces applied thereagainst. Consequently, a plate of glass introduced between two sheets 20 will not be subject to breaking or chipping and will readily assume a position in the separators while supported in the grooves 10 of floor 9.

Since the glass plates are upright, as shown, their turning moment is quite small and the sheets 20 easily maintain said plates upright. Also, because of the non-metallic yielding nature of the sheets 20, any strong forces, such as the shocks of earth movements, will be compensated for and readily absorbed by said non-metallic separator sheets.

While the sets of separators 7 may be aligned, if such is desired, flexibility of storing facilities is provided by mounting said separators at different heights above floor 9, as shown in the drawing. Thus, in the rack that is shown, four sizes of glass plates may be stored and plates varying over the standard sizes may, also, be stored since the sets of separators 7 overlap vertically.

The means 8 mounts the sets of separators and comprises hanger brackets 22 that are connected to each set of separators by a bolt 23 that is used to connect the sheets 20 and spacers 21 by passing therethrough, as shown in Fig. 3. The brackets 22 are provided on each side of each set of separators so as to be substantially aligned with the three frame components 13. Said means 8 also includes a set of transversely spaced bracket plates 24 that are butt-welded to the lower face or web of each transverse channel 16, and a complement of hanger straps 25, 26, and 27 bolted to and depending from the bracket plates 24.

As shown, the right hand set of separators 7 is affixed by its brackets 22 to two of the bracket plates 24 and is thus located closely adjacent to transverse channel 16 and has the greatest spacing above the floor 9. The next set 7 to the left is connected, by its brackets 22, to the lower end of hanger strap 25 and to an intermediate portion of hanger strap 26, the latter strap having twice the effective length of strap 25. The two other sets 7 are mounted in a similar manner to provide a successively lower position for each set 7 to the left. Finally, the left most and lowermost set 7 is carried between the longest hanger strap 27 and the adjacent vertical channel 15. Suitable bolts 28 may be used to connect the upper ends of brackets 22 to the parts to which they are fitted.

From Fig. 2, it will be seen that brackets 22 are offset above where they are affixed by bolts 23 to the respective sets of separators 7. The offsets are in a direction to provide for clearance of the heads of bolts 28 out of the path of a glass plate being inserted between the leftmost sheet 20 of one set and the rightmost sheet of an adjacent and lower set. This is shown at 29 and the same increases the capacity of the rack over the total capacity of the several sets of separators 7.

The separator sheets 20 of sets 7 thereof are alternately longitudinally offset. As seen in Figs. 1 and 3, such offset provides a projecting face against which the plate glass may be placed to facilitate insertion thereof in the space between two of the sheets. As illustrated also in Fig. 1 the floor 9 with its grooves 10 extends further forward from the vertical channels 15 than those of the separator sheets 20 which are forwardly offset. Since the floor is thus forwardly disposed relative to the ends of the sheets 20, the insertion of plate glass in the space between two of the sheets is still further facilitated because heavy sheets of glass can be rested with one corner on the floor while the upper aligned corner of the plate glass is still forward of all the sheet ends. Then by leaning the top of the glass plate one can insert it in either of two overhead separators whichever gives vertical alignment.

Moreover, as illustrated, the spaces between sheets in a set and between sets of sheets are in substantial vertical alignment with the grooves 10 in the floor 9.

The elevated position of the cross channels 16 determines the height above floor 9 of the separator sets 7.

Since the racks are rectangular, two or more of them may be placed in side-by-side relationship. Each rack will function without interference from an adjacent rack.

While the foregoing has illustrated and described what is now contemplated to be the best mode of carrying out the invention, the construction is, of course, subject to modification without departing from the spirit and scope of the invention. It is, therefore, not desired to restrict the invention to the particular form of construction illustrated and described, but to cover all modifications that may fall within the scope of the appended claims.

Having thus described the invention, what is claimed and desired to be secured by Letters Patent is:

1. In a rack for storing plate glass and provided with a longitudinally-grooved floor adapted to receive the lower edges of vertically disposed plates of glass, at least two sets of separators disposed at different distances above said floor and in longitudinal alignment therewith, each of said sets comprising a plurality of non-metallic sheets having upper edges with spacers between said upper edges, and means mounting the sheets in depending position with the spaces therebetween in substantial vertical alignment with the grooves in said floor, and means mounting the sets of separators in spaced relation comparable to the spacing of the sheets.

2. In a rack for storing plate glass and provided with a longitudinally-grooved floor adapted to receive the lower edges of vertically disposed plates of glass, at least two sets of separators disposed at different distances above said floor and in longitudinal alignment therewith, each set comprising a plurality of non-metallic sheets having upper edges with spacers between the upper edges of the sheets in each set, and means mounting the sets of sheets in depending position with the spaces therebetween in substantial vertical alignment with the grooves in said floor, said mounting means including transversely-spaced suspension straps partly vertically coextensive with one set of separators and terminating above an adjacent set, and hanger brackets interconnecting said straps and sets of separators.

3. In a rack according to claim 2: said brackets having transversely offset supporting connections to the said suspension straps to space the outer sheet of one of said sets of sheets the same distance from the outer sheet of an adjacent set of sheets that the sheets in said sets are spaced.

4. A plate glass storage rack comprising transversely spaced vertical frame members, horizontal lower frame members connecting the vertical members at their lower ends and horizontal upper frame members connecting the vertical members adjacent their upper ends, a floor on the lower frame members provided with a multiplicity of longitudinal upwardly facing grooves, plural sets of separator plates, the sets, from immediately below the upper frame members and from the inner side of the vertical frame members on one side, being disposed progressively nearer the inner side of the vertical frame member on the other side and progressively nearer the floor, the plates of each set being spaced approximately according to the transverse spacing of the floor grooves, the sets being similarly spaced from each other, whereby the plural sets of plates define spaces that are in substantial vertical alignment with the floor grooves, means connecting together the vertical frame members and the adjacent sides of an adjacent set of separator plates, and means between each two adjacent sets of plates connecting the adjacent sides thereof to the upper horizontal frame members.

5. A plate glass rack according to claim 4 in which the last-mentioned means comprises hanger members connected at their upper ends to the upper transverse frame members, at their lower ends to one of such two adjacent sets of plates, and at intermediate points to the other of such two adjacent sets of plates.

6. A plate glass storage rack having a forward end at which plate glass to be stored is adapted to be received, said rack comprising, in combination, a longitudinally grooved rectangular floor, an erect rectangular and free-standing frame extending from said floor and provided with upper horizontal and longitudinally spaced cross members spaced above the floor and with side vertical frame members disposed laterally of the longitudinal side edges of said floor, plural sets of separator sheets disposed within the frame beneath said cross members and in horizontal side-by-side relation, said sets of separators being arranged longitudinally and above the floor with said forward edges of said sets of separators offset rearwardly relative to the forward edge of the floor, and hanger means partly connecting said sets of separators to the mentioned cross members, partly to the vertical members of the free-standing frame, and partly to each other, said hanger means including at least one hanger that extends from each cross member and is connected to two adjacent sets of separators, said sets of separators being disposed at different distances above the floor.

7. A plate glass storage rack according to claim 6 in which one set of separators, adjacent one vertical frame member, is elevated above the floor a greater distance than the set of separators adjacent the other vertical frame member, and the sets of separators between the latter two sets are elevated at heights intermediate the heights of the sets that are adjacent to the vertical frame members.

(References on following page)

References Cited in the file of this patent

UNITED STATES PATENTS

| | | | |
|---|---|---|---|
| 1,238,112 | Deterling | Aug. 28, | 1917 |
| 1,272,207 | Bullen | July 9, | 1918 |
| 1,393,771 | Goedde | Oct. 18, | 1921 |
| 1,421,391 | Bower | July 4, | 1922 |
| 1,550,103 | Schumacher | Aug. 18, | 1925 |
| 1,561,755 | Taseff | Nov. 17, | 1925 |
| 1,775,018 | Coenen | Sept. 2, | 1930 |
| 1,902,338 | Riley | Mar. 21, | 1933 |
| 1,921,656 | Burrell | Aug. 8, | 1933 |
| 2,681,194 | Halvorsen | June 15, | 1954 |